United States Patent
Sillieres et al.

(10) Patent No.: US 11,635,042 B2
(45) Date of Patent: Apr. 25, 2023

(54) TURBOFAN HAVING A SET OF ROTATABLE BLADES FOR BLOCKING OFF THE DUCT FOR THE BYPASS FLOW

(71) Applicant: Airbus Operations SAS, Toulouse (FR)

(72) Inventors: Lionel Sillieres, Toulouse (FR); Simon Vanderbauwede, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/844,280

(22) Filed: Jun. 20, 2022

(65) Prior Publication Data
US 2022/0403797 A1 Dec. 22, 2022

(30) Foreign Application Priority Data
Jun. 22, 2021 (FR) ........................................ 2106646

(51) Int. Cl.
*F02K 1/72* (2006.01)
*F02K 1/76* (2006.01)

(52) U.S. Cl.
CPC ............... *F02K 1/763* (2013.01); *F02K 1/72* (2013.01); *F02K 1/766* (2013.01); *F05D 2220/323* (2013.01); *F05D 2260/53* (2013.01); *F05D 2260/606* (2013.01)

(58) Field of Classification Search
CPC ... F02K 1/70; F02K 1/72; F02K 1/763; F02K 1/766; F02K 1/566; F02K 1/60; F02K 1/605; F02K 1/62; F02K 1/09; F02K 3/075; F02K 1/64; F05D 2260/53; F05D 2260/606
See application file for complete search history.

(56) References Cited

U.S. PATENT DOCUMENTS

| 2,933,890 | A | * | 4/1960 | Morrison | F02K 1/625 138/45 |
| 4,030,290 | A | * | 6/1977 | Stachowiak | F02K 1/64 239/265.33 |
| 2015/0122904 | A1 | * | 5/2015 | Burghdoff | F02K 1/766 239/265.19 |
| 2017/0198658 | A1 | * | 7/2017 | Higgins | F02K 1/60 |

(Continued)

FOREIGN PATENT DOCUMENTS

| EP | 3686418 A1 | 7/2020 |
| EP | 3715612 A1 | 9/2020 |
| FR | 3095015 A1 | 10/2020 |

OTHER PUBLICATIONS

French Search Report; priority document.

*Primary Examiner* — Thomas P Burke
(74) *Attorney, Agent, or Firm* — Greer, Burns & Crain, Ltd.

(57) ABSTRACT

A turbofan with a nacelle having a slider that is movable between an advanced position and a retracted position to open a window between a duct and the outside, blades, each one being able to move in rotation between a stowed position and a deployed position, and a maneuvering system that moves each blade, a transmission arrangement that rotates the blades one after the other, a drive system that converts the translational movement of the slider into a rotational movement of a first blade and that has a ball screw system, an epicyclic gear train, and an assembly of arms and levers.

6 Claims, 4 Drawing Sheets

(56) References Cited

U.S. PATENT DOCUMENTS

| | | | |
|---|---|---|---|
| 2019/0284952 A1* | 9/2019 | Gardes | F01D 17/167 |
| 2020/0240359 A1 | 7/2020 | Gardes et al. | |
| 2020/0325785 A1* | 10/2020 | Gardes | F02K 1/72 |
| 2020/0378340 A1* | 12/2020 | Cousin | F02K 1/72 |
| 2021/0131380 A1* | 5/2021 | Gormley | F02K 1/09 |
| 2021/0207556 A1* | 7/2021 | Czapla | F02K 1/763 |

* cited by examiner

TURBOFAN HAVING A SET OF ROTATABLE BLADES FOR BLOCKING OFF THE DUCT FOR THE BYPASS FLOW

CROSS-REFERENCES TO RELATED APPLICATIONS

This application claims the benefit of the French patent application No. 2106646 filed on Jun. 22, 2021, the entire disclosures of which are incorporated herein by way of reference.

FIELD OF THE INVENTION

The present invention relates to a turbofan that has a set of blades that are mounted so as to be able to rotate in order to block off the duct for the bypass flow, and to an aircraft having at least one such turbofan.

BACKGROUND OF THE INVENTION

An aircraft has a fuselage to each side of which is fastened a wing. Beneath each wing is suspended at least one turbofan. Each turbofan is fastened beneath the wing by way of a pylon that is fastened between the structure of the wing and the structure of the turbofan.

The turbofan has a motor and a nacelle that is fastened around the motor. The turbofan has, between the nacelle and the motor, a bypass duct in which a bypass flow circulates.

The nacelle has a plurality of reversal doors, each one being able to move in rotation on the structure of the nacelle, between a stowed position in which it is outside the bypass duct and a deployed position in which it is positioned across the bypass duct in order to redirect the bypass flow towards a window that is in the wall of the nacelle and that is open between the bypass duct and the outside of the nacelle.

Thus, the bypass flow is redirected towards the outside and more specifically towards the front of the turbine engine in order to generate reverse thrust. Moreover, each reversal door is moved using a connecting rod that crosses the bypass duct in the stowed position and that therefore partially obstructs the bypass duct.

Although the reversal doors are entirely satisfactory, it is desirable to find different mechanisms, in particular mechanisms that are more lightweight and that in no way obstruct the bypass flow when in the stowed position.

SUMMARY OF THE INVENTION

One object of the present invention is to propose a turbofan that has a set of blades that are mounted so as to be able to rotate in order to block off the duct for the bypass flow.

To that end, there is proposed a turbofan having a longitudinal axis and having a motor and a nacelle that surrounds the motor and has a fan casing, wherein a duct for a bypass flow is delimited between the nacelle and the motor, and in which a flow of air circulates in a flow direction, the nacelle having:

- a fixed structure fastened to the fan casing,
- a mobile assembly having a mobile cowl and a slider, the mobile cowl being fastened to the slider, the slider being able to move in translation on the fixed structure in a direction of translation between an advanced position in which the slider is positioned such that the mobile cowl is close to the fan casing and an extended position in which the slider is positioned such that the mobile cowl is distanced from the fan casing so as to define between them a window that is open between the duct and the outside of the nacelle,
- a plurality of blades including a blade known as first blade, each one having a first end mounted so as to be able to move in rotation on the slider about a first axis of rotation, and wherein the blades are angularly offset from one to the next about the longitudinal axis, wherein each blade is able to move between a stowed position in which the blade is outside the duct and a deployed position in which the blade is across the duct,
- a set of actuators that move the slider between the advanced position and the extended position, and vice versa, and
- a maneuvering system that moves each blade from the stowed position to the deployed position when the slider moves from the advanced position to the extended position, and vice versa, wherein the maneuvering system has:
- for each blade, a main shaft mounted so as to be able to move in rotation on the slider about the first axis of rotation to which the blade is fastened by its first end,
- for each pair of adjacent blades, transmission means that transmit the rotation of one blade of the pair to the other blade of the same pair,
- a drive system that converts the translational movement of the slider into a rotational movement of the first blade and that has:
- a ball screw system with a grooved rod that is connected by a pivot connection to the slider, of which the screw axis is generally parallel to the translation direction, and a ball nut fastened to the fixed structure wherein the ball nut cooperates with the grooved rod so as to create a helical connection,
- an epicyclic gear train with a sun gear as one with an end of the grooved rod, an annulus gear mounted fixedly on the slider, a planet carrier mounted so as to be able to move in rotation on the slider, and a plurality of planet gears mounted so as to be able to rotate freely on the planet carrier, wherein the planet gears are distributed about the sun gear and mesh with the sun gear, and wherein the annulus gear surrounds the planet gears and meshes with them,
- an arm as one with the planet carrier and offset with respect to the screw axis,
- a first transmission lever as one with the main shaft of the first blade,
- a barrel mounted so as to be able to move in rotation on the slider about a second axis of rotation generally parallel to the translation direction, wherein the barrel bears a first tilting arm and a second tilting arm,
- a first lever wherein a first end of the first lever is mounted articulated on the arm and a second end of the first lever is mounted articulated on the first tilting arm, wherein the articulation of the first lever on the aim is a rotation of which the axis of rotation is parallel and offset with respect to the screw axis and wherein the articulation of the first lever on the first tilting arm is a rotation of which the axis of rotation is parallel and offset with respect to the second axis of rotation of the barrel,
- a second lever wherein a first end of the second lever is mounted articulated on the first transmission lever and a second end of the second lever is mounted articulated on the second tilting arm, and wherein the articulation of the second lever on the first transmission lever is a rotation of which the axis of rotation is parallel and offset with respect to the first axis of rotation, and wherein the articulation of the second lever on the second tilting arm is a rotation of which the axis of rotation is parallel and offset with respect to the second axis of rotation of the barrel.

A turbine engine of this kind permits a reduction in mass by replacing the reversal doors and their drive mechanisms with more lightweight pivoting blades having a simplified maneuvering system.

Advantageously, the first transmission lever, the second lever and the second tilting arm are dimensioned such that when the slider is in the advanced position and the blades are in the stowed position, the second axis of rotation, the axis of rotation of the articulation between the second lever and the second tilting arm, and the axis of rotation of the articulation between the second lever and the first transmission lever, are coplanar and the axis of rotation of the articulation between the second lever and the second tilting arm is between the two others.

Advantageously, the arm, the first lever and the first tilting arm are dimensioned such that when the slider is in the extended position and the blades are in the deployed position, the screw axis, the axis of rotation of the articulation between the arm and the first lever, and the axis of rotation of the articulation between the first lever and the first tilting arm, are coplanar and the axis of rotation of the articulation between the arm and the first lever is between the two others.

Advantageously, the transmission means have, for each main shaft of the pair of adjacent blades, a second transmission lever as one with the main shaft, and a connecting rod of which each end is mounted articulated on one of the two second transmission levers.

Advantageously, the grooved rod is fastened to the sun gear via a universal joint.

The invention also proposes an aircraft having at least one turbofan according to one of the preceding variants.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

In the following description, terms relating to a position are considered in relation to the direction of flow of the air in a turbine engine that therefore flows from the front towards the rear of the aircraft.

Figure 1:
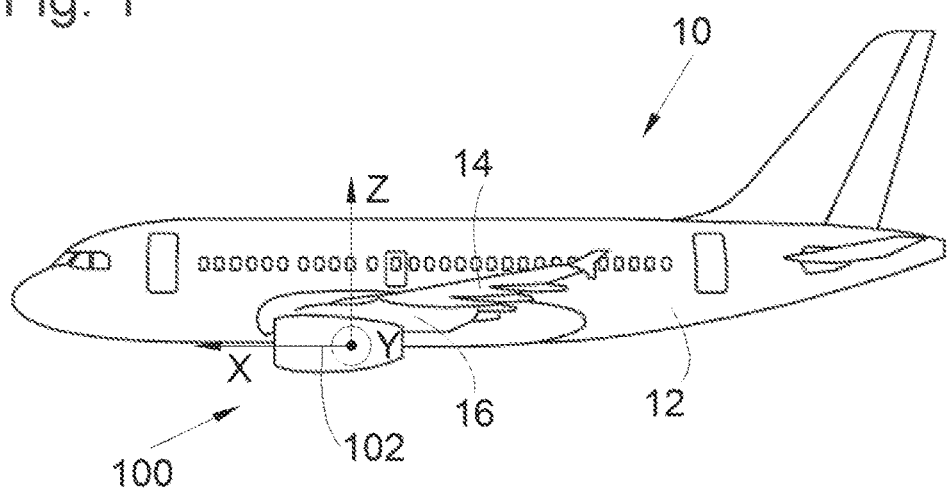
FIG. 1 is a side view of an aircraft having a turbofan according to the invention.

FIG. 1 shows an aircraft 10 that has a fuselage 12 to each side of which is fastened a wing 14 that bears at least one turbofan 100 according to the invention. The turbofan 100 is fastened beneath the wing 14 by way of a pylon 16.

Figure 2:
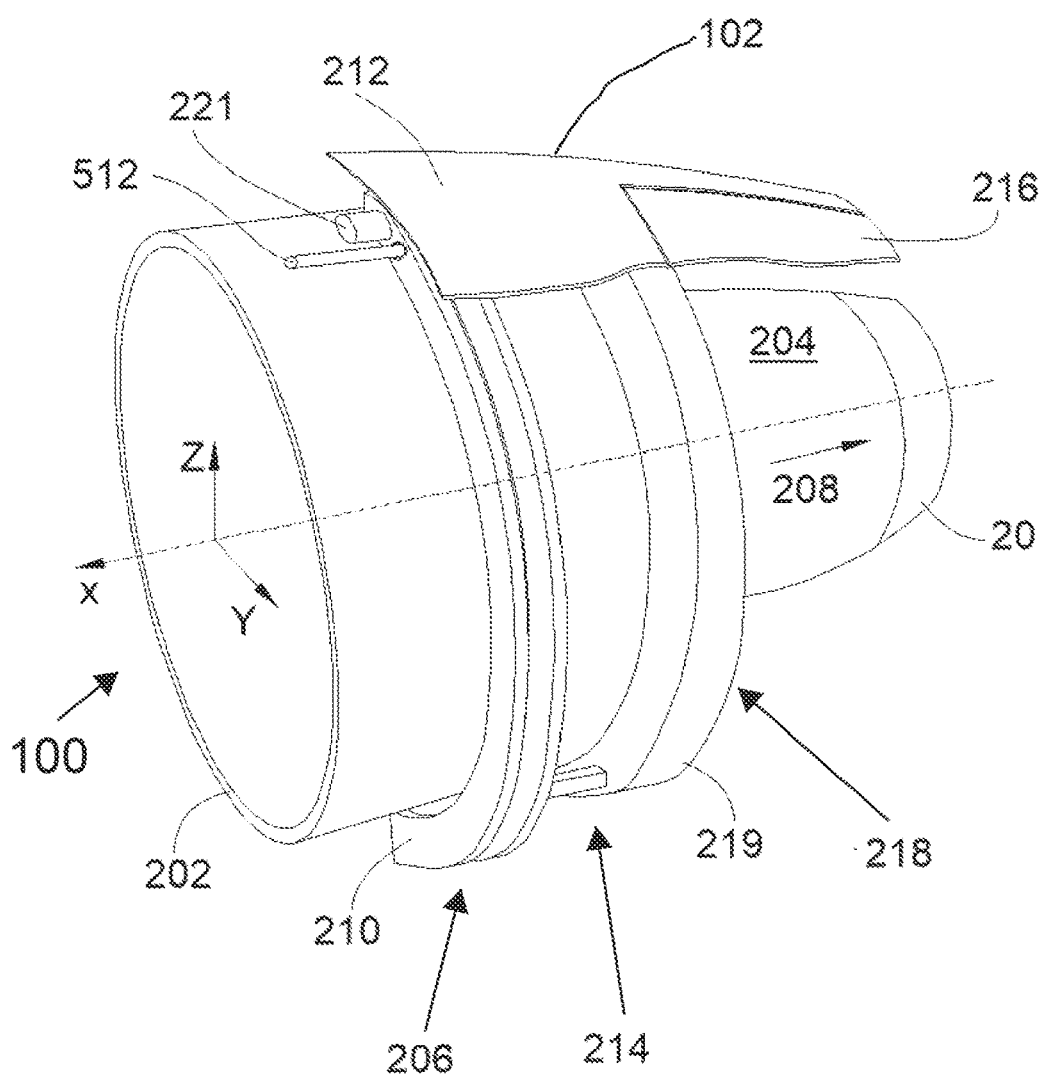
FIG. 2 is a perspective view of the turbofan according to the invention, in the advanced and stowed position.
Figure 3:
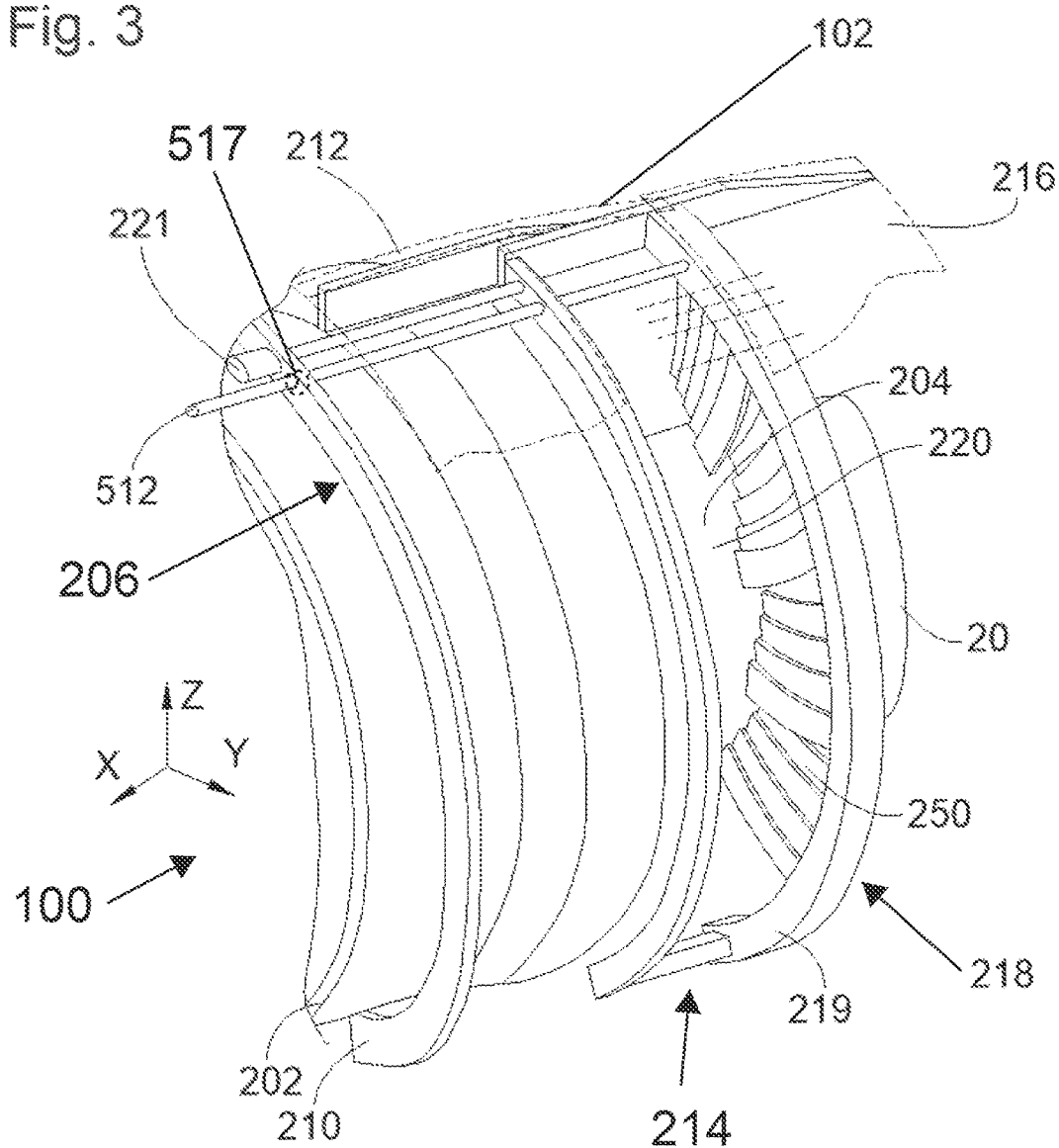
FIG. 3 is a perspective view of the turbofan according to the invention in the extended and deployed position.

FIG. 2 and FIG. 3 show the turbofan 100 that has a nacelle 102 and a motor 20 that is housed inside the nacelle 102 and that has a fan casing 202. The motor 20 is represented by its rear exhaust part.

In the following description, and by convention, X denotes the longitudinal axis of the turbofan 100 that is parallel to the longitudinal axis of the aircraft 10 oriented positively towards the front of the aircraft 10, Y denotes the transverse axis that is horizontal when the aircraft is on the ground, and Z denotes the vertical axis, these three directions X, Y and Z being mutually orthogonal.

Figure 4:
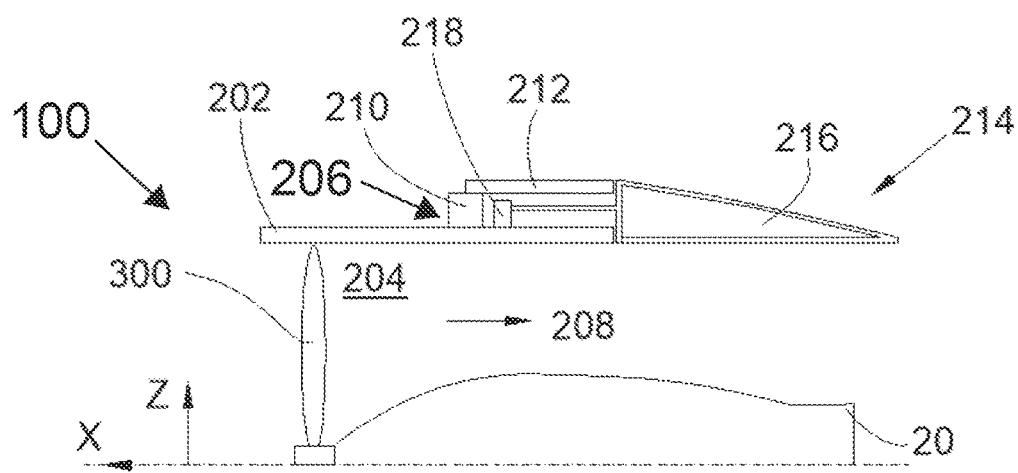
FIG. 4 is a schematic depiction of a turbofan according to the invention, viewed in section along a vertical plane.

FIG. 2 and FIG. 3 show the turbofan 100 in two different use positions, and FIG. 4 shows a schematic depiction in section of the turbofan 100.

The turbofan 100 has, between the nacelle 102 and the motor 20, a duct 204 in which there circulates a bypass flow 208 coming from the air intake through a fan 300, and that therefore flows in the flow direction from the front towards the rear.

The nacelle 102 has a fixed structure 206 that is mounted fixedly on the fan casing 202. In particular in this case, the fixed structure 206 is made up of a front frame 210 mounted around the fan casing 202 and outer panels 212 forming an aerodynamic surface that are shown as transparent in FIG. 3, and of which a portion is cut away in FIGS. 2 and 3.

The nacelle 102 has a mobile assembly 214 that has a mobile cowl 216 (also transparent in FIG. 3) of which a portion is cut away in FIGS. 2 and 3 and that forms the outer walls of the nozzle.

The nacelle 102 also has a slider 218. In this case, the slider 218 is in the form of a cylinder having openwork walls. The mobile cowl 216 is fastened to and downstream of the slider 218 with respect to the direction of flow of the flow of air in the turbofan 100.

The slider 218 is mounted so as to be able to move in translation in a direction of translation generally parallel to the longitudinal axis X on the fixed structure 206 of the nacelle 102.

The slider 218 is able to move between an advanced position (FIG. 2) and a extended position (FIG. 3) and vice versa. In the advanced position, the slider 218 is positioned as far forward as possible, with respect to the flow direction, such that the mobile cowl 216 is close to the outer panels 212 and to the fan casing 202 and thus forms an aerodynamic surface. In the extended position, the slider 218 is positioned as far aft as possible, with respect to the flow direction, such that the mobile cowl 216 is distanced from the outer panels 212 and from the fan casing 202 so as to define between them a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the extended position, the mobile cowl 216 and the fan casing 202, and the outer panels 212, are spaced apart from one another and define between them the window 220 that is open between the duct 204 and the outside of the nacelle 102. That is to say, the air from the bypass flow 208 passes through the window 220 to end up outside the turbofan 100.

The slider 218 is guided in translation by any appropriate means, such as, for example, slideways between the fixed structure 206 and the slider 218.

The nacelle 102 also has a set of actuators 221 that move the slider 218 in translation between the advanced position and the extended position and vice versa. Each actuator 221 is controlled by a control unit or controller, for example of the processor type, which controls the movements in one direction or the other according to the requirements of the aircraft 10.

Each actuator 221 may, for example, be in the form of a double-action jack (two working directions), of which the cylinder is fastened to the fixed structure 206, and, more particularly in this case, to the front frame 210, and a rod is fastened to the slider 218.

In order to orient the flow of air leaving the window 220, cascades can be fastened to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

In the embodiment of the invention that is shown in FIG. 3, the slider 218 has a U-shaped profile 219 that is coaxial with the longitudinal axis X and open towards the longitudinal axis X.

The nacelle 102 has a plurality of blades 250 that are moved by a maneuvering system.

Figure 5:
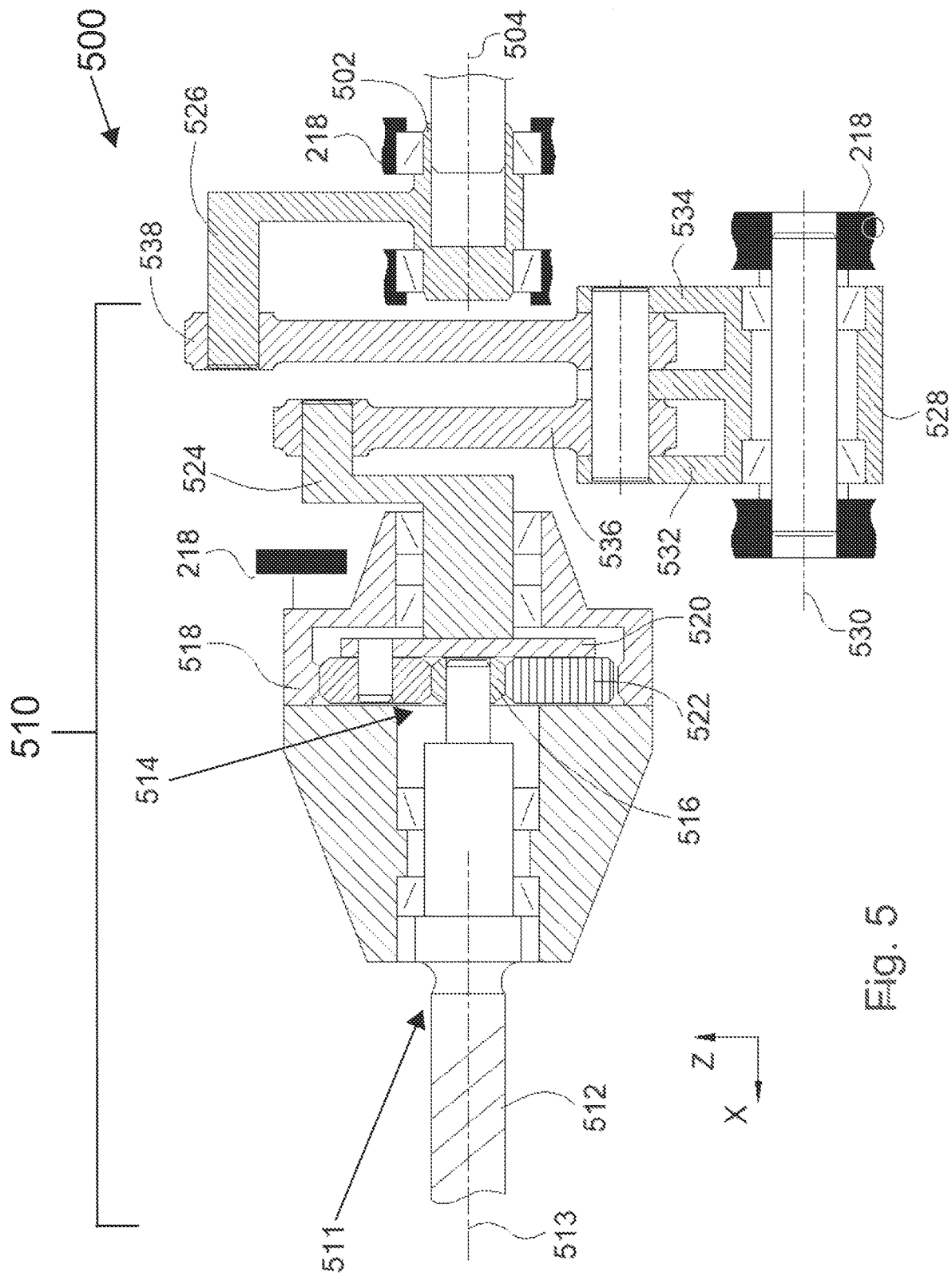
FIG. 5 is a view in section of a maneuvering system according to the invention.
Figure 6:
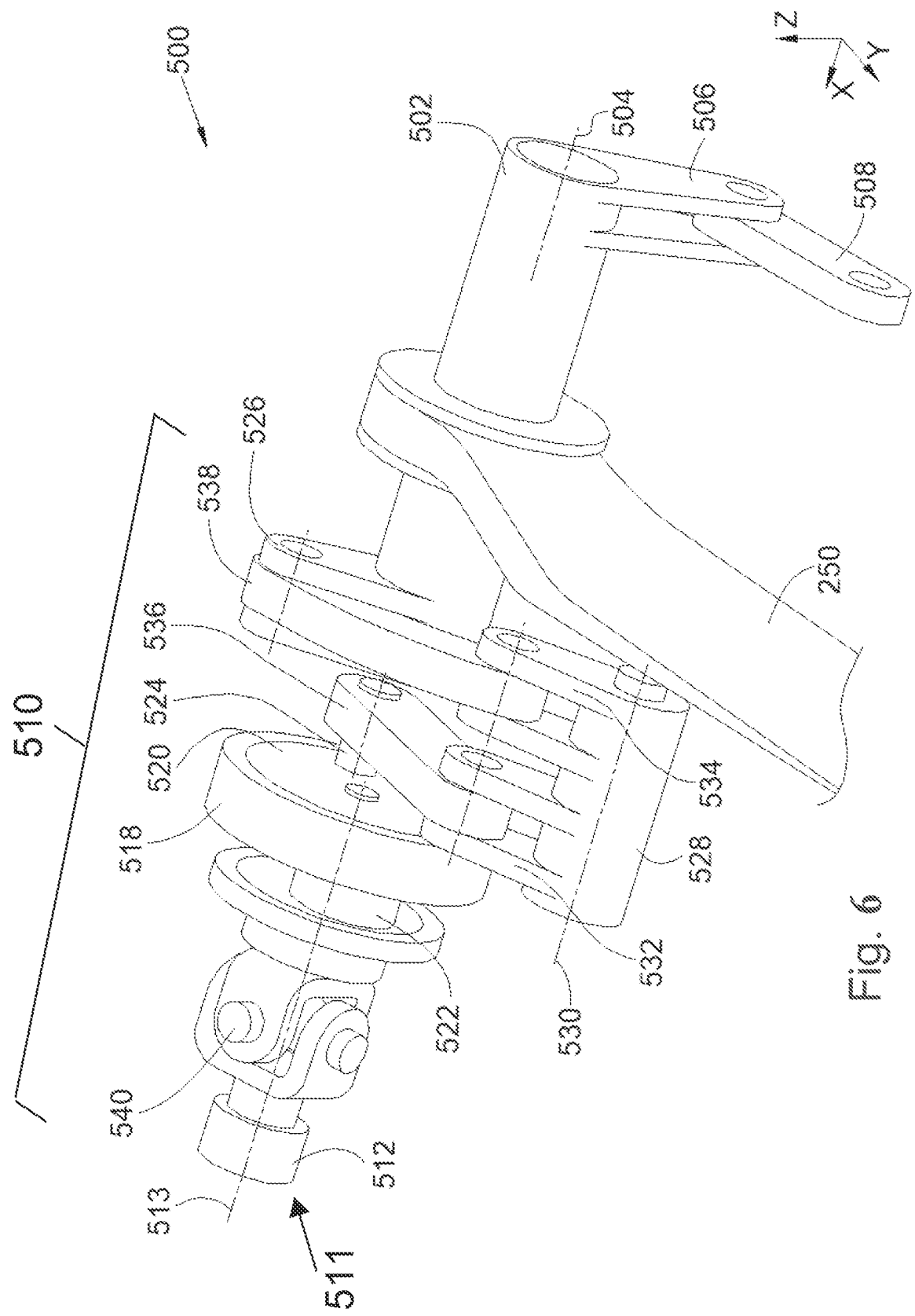
FIG. 6 is a perspective view of the maneuvering system according to the invention.

FIG. 5 and FIG. 6 show the maneuvering system 500.

Each blade 250 is mounted so as to be able to move in rotation on the slider 218, in this case on the U-shaped profile 219, about a first axis of rotation 504 that in this case is generally parallel to the translation direction. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 is mounted so as to be able to move at a first end while a second end moves closer to the motor 20 when the blade 250 is deployed so as to best block off the duct 204.

The blades 250 are angularly offset from one to the next about the longitudinal axis X.

The number of blades 250 and the shape of each of them depend on the dimensions of the turbofan 100 and on the width of each blade 250 in order that, in the deployed position, the blades 250 block off the majority of the duct 204.

Passage from the stowed position to the deployed position is brought about by rotation of the blade 250 towards the inside of the turbine engine 100.

The stowed position is adopted when the slider 218 is in the advanced position and the deployed position is adopted when the slider 218 is in the extended position.

The maneuvering system 500 moves each blade 250 from the stowed position to the deployed position when the slider 218 moves from the advanced position to the extended position, and vice versa.

Thus, operation comprises, starting from the advanced/stowed position, ordering activation of the actuators 221 so as to move the slider 218 from the advanced position to the extended position. During this movement, the maneuvering system 500 moves the blades 250 from the stowed position to the deployed position.

Conversely, operation thus comprises, starting from the extended/deployed position, ordering activation of the actuators so as to move the slider 218 from the extended position to the advanced position. During this movement, the maneuvering system 500 moves the blades 250 from the deployed position to the stowed position.

The use of the blades 250 mounted so as to be able to rotate on the slider 218 makes it possible to lighten the assembly compared with the use of reversal doors of the prior art.

For each blade 250, the maneuvering system 500 has a main shaft 502 that is mounted so as to be able to move in rotation on the slider 218 about the first axis of rotation 504, and to which the blade 250 is fastened by its first end. Passage from the deployed position to the stowed position and vice versa is brought about by rotation about the first axis of rotation 504. In this case, each main shaft 502 is mounted so as to be able to move in rotation on the slider 218 and more particularly the U-shaped profile 219.

The maneuvering system 500 makes it possible to drive in rotation a plurality of blades 250 that are disposed next to one another. To this end, each main shaft 502 has, in this case downstream of the blade 250, a second transmission lever 506, which in this case is in the form of a clevis, and for two second transmission levers 506, the maneuvering system 500 has a connecting rod 508 of which each end is mounted articulated on one of the two second transmission levers 506. The articulation of the rod 508 on the second transmission lever 506 is in this case a rotation of which the axis of rotation is parallel and offset with respect to the first axis of rotation 504. Such an arrangement thus makes it possible, when one of the blades 250 is moved in rotation, to move the other blades 250 in rotation in the same direction, at the same time, one after the other.

The second transmission lever 506 and the connecting rod 508 form transmission means that, for each pair of adjacent blades 250, transmit the rotation of one blade 250 of the pair to the other blade 250 of the same pair. Thus, by moving a first blade 250 in rotation, the other blades 250 that are associated therewith are also moved. The transmission means thus have, for each main shaft 502 of the pair of adjacent blades 250, a second transmission lever 506 as one with the main shaft 502, and a connecting rod 508 of which each end is mounted articulated on one of the two second transmission levers 506.

In order to maneuver the first blade 250, the maneuvering system 500 has a drive system 510 that converts the translational movement of the slider 218 into a rotational movement of the first blade 250. By virtue of the transmission means, the rotational movement of the first blade 250 drives the movement of the other blades 250, one after the other.

The drive system 510 has a ball screw system 511 with a grooved rod 512 of which the screw axis 513 is generally parallel to the translation direction, and a ball nut 517 (see FIG. 3) fastened to the fixed structure 206, and, more particularly in this case, to the front frame 210, and wherein the ball nut 517 cooperates with the grooved rod 512 so as to create a helical connection. The grooved rod 512 is furthermore as one with the slider 218 and therefore moves with it in translation. In other words, the grooved rod 512 is connected to the slider 218 by a pivot connection, so as to move in translation with the slider 218 while at the same time being able to rotate freely with respect to the slider 218. Thus, when the slider 218 moves in translation, the grooved rod 512 moves in rotation as a result of the interaction between the immobile ball nut 517 and the grooved rod 512.

In the embodiment of the invention that is presented here, the screw axis 513 of the grooved rod 512 is aligned with the first axis of rotation 504.

The drive system 510 has an epicyclic gear train 514 with a sun gear 516 as one with an end of the grooved rod 512, an annulus gear 518 mounted fixedly on the slider 218 and more particularly the U-shaped profile 219, a planet carrier 520 mounted so as to be able to move in rotation on the slider 218 and, more particularly, the U-shaped profile 219, and a plurality of planet gears 522 mounted so as to be able to rotate freely on the planet carrier 520. The planet gears 522 are distributed about the sun gear 516 and mesh with the sun gear 516, and the annulus gear 518 surrounds the planet gears 522 and meshes with them. The axes of the elements constituting the epicyclic gear train 514 are all generally parallel to the translation direction.

The drive system 510 also has an arm 524 as one with the planet carrier 520 and offset with respect to the screw axis 513.

The main shaft 502 of the first blade 250 has, in this case upstream of the blade 250, a first transmission lever 526 as one with the main shaft 502.

The drive system 510 also has a barrel 528 mounted so as to be able to move in rotation on the slider 218 and, more particularly, the U-shaped profile 219 about a second axis of rotation 530 generally parallel to the translation direction.

The barrel 528 bears a first tilting aim 532 and a second tilting arm 534, wherein in the embodiment of the invention that is presented here, each tilting arm 532, 534 is in the form of a clevis.

The drive system 510 also has a first lever 536 and a second lever 538.

A first end of the first lever 536 is mounted articulated on the arm 524 and a second end of the first lever 536 is mounted articulated on the first tilting arm 532.

The articulation of the first lever 536 on the arm 524 is a rotation of which the axis of rotation is parallel and offset with respect to the screw axis 513. The articulation of the first lever 536 on the first tilting arm 532 is a rotation of which the axis of rotation is parallel and offset with respect to the second axis of rotation 530 of the barrel 528.

A first end of the second lever 538 is mounted articulated on the first transmission lever 526 and a second end of the second lever 538 is mounted articulated on the second tilting arm 534.

The articulation of the second lever 538 on the first transmission lever 526 is a rotation of which the axis of rotation is parallel and offset with respect to the first axis of rotation 504. The articulation of the second lever 538 on the second tilting arm 534 is a rotation of which the axis of rotation is parallel and offset with respect to the second axis of rotation 530 of the barrel 528.

Thus, during the translational movement of the slider 218, the grooved rod 512 moves in translation and in rotation about the screw axis 513. The rotation of the grooved rod 512 drives the setting in rotation of the epicyclic gear train 514 and therefore of the planet carrier 520 and of the arm 524. The movement of the arm 524 drives the tilting of the barrel 528 through the action of the first lever 536 on the first tilting arm 532. The tilting of the barrel 528 drives the movement of the second tilting arm 534 and therefore the movement of the first transmission lever 526 through the action of the second lever 538. The movement of the first transmission lever 526 drives the rotation of the main shaft 502 and therefore of the first blade 250 and subsequently of the other blades 250.

The maneuvering system 500 is thus particularly lightweight and easy to implement.

In order to avoid possible problems of misalignment during movement of the slider 218, the grooved rod 512 is fastened to the sun gear 516 via a universal joint 540.

The first transmission lever 526, the second lever 538 and the second tilting arm 534 are dimensioned such that when the slider 218 is in the advanced position and the blades 250 are in the stowed position, the second axis of rotation 530, the axis of rotation of the articulation between the second lever 538 and the second tilting arm 534, and the axis of rotation of the articulation between the second lever 538 and the first transmission lever 526, are coplanar and the axis of rotation of the articulation between the second lever 538 and the second tilting arm 534 is between the two others. This arrangement makes it possible to reach a maximum blocking position as a result of the alignment of the axes of rotation in the advanced/stowed position.

The arm 524, the first lever 536 and the first tilting arm 532 are dimensioned such that when the slider 218 is in the extended position and the blades 250 are in the deployed position, the screw axis 513, the axis of rotation of the articulation between the arm 524 and the first lever 536, and the axis of rotation of the articulation between the first lever 536 and the first tilting arm 532, are coplanar and the axis of rotation of the articulation between the arm 524 and the first lever 536 is between the two others. This arrangement makes it possible to reach a maximum blocking position as a result of the alignment of the axes of rotation in the extended/deployed position.

The blades 250, and in particular the first blade 250, are removable for maintenance reasons, and so that they can be replaced if necessary.

A casing can be arranged around a part of the drive system 510, and, in particular, around the epicyclic gear train 514, the arm 524, the first transmission lever 526, the barrel 528, the first lever 536 and a second lever 538. In other words, the drive system 510 can be arranged in the casing. This advantageously makes it possible to prevent contamination (by dust, for example) of the drive system 510 and allows a lubrication device of the drive system 510 to be put in place in the casing.

The invention has been more particularly described in the case of a nacelle beneath a wing but can be applied to a nacelle situated at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and having a motor and a nacelle that surrounds the motor and has a fan casing, wherein a duct for a bypass flow is delimited between the nacelle and the motor and in which a flow of air circulates in a flow direction, said nacelle having:
   a fixed structure fastened to the fan casing,
   a mobile assembly having a mobile cowl and a slider, the mobile cowl being fastened to the slider, the slider being movable in translation on the fixed structure in a translation direction between an advanced position in which the slider is positioned such that the mobile cowl is close to the fan casing and a extended position in which the slider is positioned such that the mobile cowl is distanced from the fan casing to define between them a window that is open between the duct and an outside of the nacelle, a plurality of blades including a first blade, each one having a first end mounted to be able to move in rotation on the slider about a first axis of rotation and wherein the plurality of blades are angularly offset from one to the next about the longitudinal axis, wherein each blade is able to move between a stowed position in which the blade is outside the duct and a deployed position in which the blade is across the duct, a set of actuators that move the slider between the advanced position and the extended position, and vice versa, and a maneuvering system that moves each blade from the stowed position to the deployed position when the slider moves from the advanced position to the extended position, and vice versa, wherein the maneuvering system has:

for each blade, a main shaft mounted to be able to move in rotation on the slider about the first axis of rotation which is fastened by the first end of the blade, for each pair of adjacent blades, transmission means that transmit the rotation of one blade of the pair of adjacent blades to another blade of the same pair, a drive system that converts the translational movement of the slider into a rotational movement of the first blade and that has:

a ball screw system with a grooved rod that is connected by a pivot connection to the slider, of which a screw axis is generally parallel to the translation direction, and a ball nut fastened to the fixed structure wherein the ball nut cooperates with the grooved rod to create a helical connection, an epicyclic gear train with a sun gear as one with an end of the grooved rod, an annulus gear mounted fixedly on the slider, a planet carrier mounted to be able to move in rotation on the slider, and a plurality of planet gears mounted to be able to rotate freely on the planet carrier, wherein the plurality of planet gears are distributed about the sun gear and mesh with the sun gear, and wherein the annulus gear surrounds and meshes with the plurality of planet gears, an arm as one with the planet carrier and offset with respect to the screw axis, a first transmission lever as one with said main shaft of the first blade, a barrel mounted to be able to move in rotation on the slider about a second axis of rotation generally parallel to the translation direction, wherein the barrel bears a first tilting arm and a second tilting arm, a first lever, wherein a first end of the first lever is mounted articulated on the arm and a second end of the first lever is mounted articulated on the first tilting arm, wherein the articulation of the first lever on the arm is a rotation of which an axis of rotation is parallel and offset with respect to the screw axis and wherein the articulation of the first lever on the first tilting arm is a rotation of which an axis of rotation is parallel and offset with respect to the second axis of rotation, a second lever, wherein a first end of the second lever is mounted articulated on the first transmission lever and a second end of the second lever is mounted articulated on the second tilting arm, and wherein the articulation of the second lever on the first transmission lever is a rotation of which an axis of rotation is parallel and offset with respect to the first axis of rotation, and wherein the articulation of the second lever on the second tilting arm is a rotation of which an axis of rotation is parallel and offset with respect to the second axis of rotation.

2. The turbofan according to claim 1, wherein the first transmission lever, the second lever and the second tilting arm are dimensioned such that when the slider is in the advanced position and the plurality of blades are in the stowed position, the second axis of rotation, the axis of rotation of the articulation between the second lever and the second tilting arm, and the axis of rotation of the articulation between the second lever and the first transmission lever, are coplanar and the axis of rotation of the articulation between the second lever and the second tilting arm is between the second axis of rotation and the axis of rotation of the articulation between the second lever and the first transmission lever.

3. The turbofan according to claim 1, wherein the arm, the first lever and the first tilting arm are dimensioned such that when the slider is in the extended position and the blades are in the deployed position, the screw axis, the axis of rotation of the articulation between the arm and the first lever, and the axis of rotation of the articulation between the first lever and the first tilting arm, are coplanar and the axis of rotation of the articulation between the arm and the first lever is between the screw axis and the axis of rotation of the articulation between the first lever and the first tilting arm.

4. The turbofan according to claim 1, wherein the transmission means have, for each main shaft of said pair of adjacent blades, a second transmission lever as one with said main shaft, and a connecting rod of which each end is mounted articulated on one of the two second transmission levers.

5. The turbofan according to claim 1, wherein the grooved rod is fastened to the sun gear via a universal joint.

6. An aircraft having at least one turbofan according to claim 1.

* * * * *